United States Patent
Kosaka et al.

(10) Patent No.: US 8,579,074 B2
(45) Date of Patent: Nov. 12, 2013

(54) INTAKE SILENCER FOR GAS TURBINE

(75) Inventors: Teruo Kosaka, Kanagawa (JP); Yuki Kosaka, Chiba (JP); Yoshiyuki Doi, Hyogo (JP); Katsutoshi Okuno, Hyogo (JP)

(73) Assignees: Alphatech Co., Ltd., Tokyo (JP); Mitsubishi Heavy Industries, Ltd., Hyogo (JP)

( * ) Notice: Subject to any disclaimer, the term of this patent is extended or adjusted under 35 U.S.C. 154(b) by 0 days.

(21) Appl. No.: 12/733,650

(22) PCT Filed: Sep. 13, 2007

(86) PCT No.: PCT/JP2007/067810
§ 371 (c)(1),
(2), (4) Date: Jun. 28, 2010

(87) PCT Pub. No.: WO2009/034629
PCT Pub. Date: Mar. 19, 2009

(65) Prior Publication Data
US 2010/0263964 A1    Oct. 21, 2010

(51) Int. Cl.
  *F01N 1/24* (2006.01)
  *E04F 17/04* (2006.01)
(52) U.S. Cl.
  USPC .......................... 181/214; 181/222; 181/224
(58) Field of Classification Search
  USPC ................ 181/210, 214, 222, 224
  See application file for complete search history.

(56) References Cited

U.S. PATENT DOCUMENTS

| | | | | |
|---|---|---|---|---|
| 2,916,101 A | * | 12/1959 | Naman | 181/224 |
| 3,033,307 A | | 5/1962 | Sanders et al. | |
| 3,195,679 A | * | 7/1965 | Duda et al. | 181/222 |
| 3,511,337 A | * | 5/1970 | Pease et al. | 181/224 |
| 3,739,872 A | * | 6/1973 | McNair | 181/218 |
| 3,895,686 A | | 7/1975 | Savkar et al. | |
| 4,050,913 A | * | 9/1977 | Roach | 96/381 |
| 4,266,602 A | * | 5/1981 | White et al. | 165/124 |

(Continued)

FOREIGN PATENT DOCUMENTS

| | | |
|---|---|---|
| EP | 0 039 727 B | 5/1985 |
| EP | 1 262 666 A | 12/2002 |

(Continued)

OTHER PUBLICATIONS

Translation of JP S53-47406 A (as cited in IDS from Mar. 12, 2010), Translation done by FLS, Inc., Dec. 2010.*

*Primary Examiner* — Jeremy Luks
(74) *Attorney, Agent, or Firm* — DLA Piper LLP (US)

(57) ABSTRACT

An intake silencer of a gas turbine capable of efficient noise reduction in which a high frequency sound-absorbing splitter group composed of a plurality of sound-absorbing splitters capable of reducing highfrequency component noise and a middle/low sound-absorbing splitter group composed of a plurality of sound-absorbing splitters capable of reducing middle/low frequency component noise are disposed separately in a gas flow direction. High frequency component noise is reduced by the high frequency sound-absorbing splitter group, and middle/low frequency component noise is reduced by the middle/low sound-absorbing splitter group.

3 Claims, 6 Drawing Sheets

(56) References Cited

U.S. PATENT DOCUMENTS

| | | | |
|---|---|---|---|
| 4,316,522 A * | 2/1982 | Hirschorn | 181/224 |
| 5,332,872 A * | 7/1994 | Ewanek | 181/224 |
| 5,728,979 A * | 3/1998 | Yazici et al. | 181/224 |
| 5,817,990 A * | 10/1998 | Furse | 181/224 |
| 6,145,616 A * | 11/2000 | Ewanek | 181/224 |
| 6,260,658 B1 * | 7/2001 | Darrell et al. | 181/224 |
| 6,342,005 B1 * | 1/2002 | Daniels et al. | 454/338 |
| 6,622,818 B2 * | 9/2003 | Jenvey | 181/224 |
| 6,802,690 B2 * | 10/2004 | Han et al. | 415/119 |
| 6,945,355 B2 * | 9/2005 | Ludwig et al. | 181/224 |
| 7,258,196 B2 * | 8/2007 | Radatus et al. | 181/224 |

FOREIGN PATENT DOCUMENTS

| | | |
|---|---|---|
| EP | 1 732 062 A | 12/2006 |
| JP | S50-46805 U | 5/1975 |
| JP | S53-47406 U | 4/1978 |
| JP | H11-82168 | 3/1999 |
| JP | 2003-97292 | 4/2003 |
| JP | 2004-28107 | 1/2004 |

\* cited by examiner

A → POWER LEVEL OF NOISE GENERATED IN GAS TURBINE dB(A)
B → NOISE AT FRONT OF INTAKE FILTER BEFORE SILENCER INSTALLATION dB(A)
C₂ → NOISE AT FRONT OF INTAKE FILTER AFTER SILENCER INSTALLATION dB(A)

A → POWER LEVEL OF NOISE GENERATED IN GAS TURBINE dB(A)
B → NOISE AT FRONT OF INTAKE FILTER BEFORE SILENCER INSTALLATION dB(A)
C → NOISE AT FRONT OF INTAKE FILTER AFTER SILENCER INSTALLATION dB(A)

INTAKE SILENCER FOR GAS TURBINE

TECHNICAL FIELD

The present invention relates to an intake silencer for a gas turbine. In particular, the present invention relates to an intake silencer for a gas turbine capable of successfully reducing intake noise.

BACKGROUND ART

An intake silencer for a gas turbine has been known since the past (refer to, for example, Patent Gazette 1), in which the intake silencer is disposed in a sealed flow path of the intake side of a gas turbine, and is configured by a sound-absorbing splitter group in which a plurality of panel-shaped sound-absorbing splitters including a sound-absorbing material therein is disposed in parallel along a gas flow direction.

Conventionally, an intake silencer used in a large gas turbine specifically has a noise reduction structure configured by a unitary sound-absorbing splitter in which only steel sound-absorbing splitters with a thickness of 200 millimeters are disposed in parallel along a gas flow direction. Because the sound-absorbing splitter with a thickness of 200 millimeters reduces noise mainly at frequencies from 500 Hz to 1 kHz that do not match the dominant frequency 2 kHz of the gas turbine intake noise, noise cannot be efficiently reduced.

Moreover, when a required amount of noise reduction is increased, the length of the sound-absorbing splitter is increased to reduce the dominant frequency 2 kHz of the gas turbine intake noise. As a result of the length of the sound-absorbing splitter being increased, noise at frequencies 1 kHz and below that does not require a very large amount of reduction is unnecessarily reduced, causing needless noise reduction.

As described above, the conventional intake silencer has disadvantages, in that noise reduction efficiency is poor because of the mismatch in noise frequencies to be reduced, size is increased as a result of the length simply being increased based on the amount of noise reduction, and the intake silencer is heavy because the entire splitter is made of steel.

The main components of the intake noise generated from the gas turbine are a fundamental frequency generated by the rotation of a compressor in the gas turbine and its overtones. These frequencies are dominant compared to other frequencies. The fundamental frequency is determined by the rotation frequency multiplied by the number of blades. In the gas turbine, the rotation frequency is high and the number of blades is large. Therefore, the fundamental frequency is a high frequency (for example, 3600(rpm)×36(blades)/60=2160(Hz)).

The intake noise generated at the suction opening of the gas turbine differs depending on the type and capacity of the gas turbine. However, an approximate noise level within a duct is from 120 dB(A) to 130 dB(A).

As many equipments of the gas turbine are installed outdoor, the acceptable noise level for areas surrounding the equipments is 85 dB (A) in terms of working environment, so the intake silencer is required to reduce a large amount of noise, from 35 dB(A) to 45 dB(A).

Patent Gazette 1: Japanese Patent Laid-open Publication No. 2004-28107

DISCLOSURE OF INVENTION

Problem to be Solved by the Invention

The intake noise generated from the suction opening of the gas turbine has a frequency characteristic in which high frequencies, mainly a fundamental frequency 2 kHz and its overtone and half overtone, 4 kHz and 1 kHz, are dominant.

The gas turbine was originally developed in Europe and the United States. Domestic gas turbines were put into practical use based on the basic technologies of the original gas turbine.

The same applies to the intake silencer. The structure of the conventional intake silencer is an imitation of the structure used in Europe and the United States. As described above, the conventional intake silencer has a unitary sound-absorbing splitter noise reduction structure of steel in which sound-absorbing splitters having a thickness of 200 millimeters are disposed in parallel along the gas flow direction.

The conventional intake silencer for a gas turbine will be described with reference to FIG. 5.

In FIG. 5, a plurality of panel-shaped sound-absorbing splitters 3, 3 is disposed in parallel along a gas flow direction indicated by a thick arrow, on a downstream side of an intake filter chamber F in the gas flow direction, within a sealed flow path blocked from its periphery by a duct 1 on an intake side of a gas turbine. Each sound-absorbing splitter 3 has a steel outer peripheral wall 4 forming a rough rectangular panel. Numerous through holes (not shown) are formed on each of two mutually opposing side plates 4A and 4B of the outer peripheral wall 4. The interior of the outer peripheral wall 4 is filled with a sound-absorbing material (not shown), such as a glass wool board. The outer peripheral wall 4 is fixed by welding or by a plurality of rivets (not shown).

Moreover, steel tapered frame members 5A and 5B are attached to a front end section and a rear end section of the outer peripheral wall 4, each frame member 5A and 5B forming a triangle from a planar view. The tapered frame members 5A and 5B straighten gas flow passing through the splitter.

A length of the sound-absorbing splitter 3 in the gas flow direction is about 4.8 meters. A width of the sound-absorbing splitter 3 is about 20 centimeters. Moreover, a distance between a pair of adjacent sound-absorbing splitters 3 and 3 is about 20 centimeters.

Noise reduction effects of a conventional intake silencer of a gas turbine such as this will be described with reference to a graph in FIG. 6.

As indicated by a line A in FIG. 6, the power level of the noise generated in the gas turbine is a maximum of under 150 dB (A) at the dominant frequency 2 kHz.

On the other hand, as indicated by a line B in FIG. 6, the noise at the front of the intake filter before installation of the intake silencer is a maximum of under 120 dB (A) at the dominant frequency 2 kHz.

As indicated by a line C in FIG. 6, the noise at the front of the intake filter in the intake filter chamber F after installation of the intake silencer is reduced to 50 dB(A) at the frequency 500 Hz. However, the noise is merely reduced to over 80 dB(A) at the frequency 4 kHz. The noise is not sufficiently reduced over the overall frequency range.

In other words, the conventional sound-absorbing splitter 3, described above, mainly reduces the frequencies 500 Hz to 1 kHz that do not match the dominant frequency 2 kHz of the gas turbine intake noise. Therefore, the noise cannot be efficiently reduced.

Moreover, in response to an increase in the required amount of noise reduction, the sound-absorbing splitter 3 is simply lengthened to a length allowing reduction of noise at a high frequency range centering on the frequency 2 kHz that is a characteristic of the gas turbine intake noise.

However, as described above, lengthening the sound-absorbing splitter 3 causes needless noise reduction in that the noise at a low frequency range (1 kHz and below) that does not require a very large amount of reduction is unnecessarily reduced.

As described above, in the conventional intake silencer, the sound-absorbing splitter has a unitary structure. Therefore, problems occur in that noise reduction efficiency is poor because of the mismatch in noise frequencies to be reduced, size is increased as a result of the length simply being increased based on the amount of noise reduction, and the intake silencer is heavy because the entire splitter is made of steel.

Therefore, an object of the present invention is to provide an intake silencer for a gas turbine capable of efficient noise reduction.

Means for Solving Problem

To achieve the above-described object, an intake silencer of a gas turbine according to a first aspect of the present invention is an intake silencer for a gas turbine disposed on a sealed flow path on an intake side of a gas turbine and configured by a sound-absorbing splitter group composed of a plurality of panel-shaped sound-absorbing splitters including a sound-absorbing material therein disposed in parallel along a gas flow direction. In the intake silencer of a gas turbine, a high frequency sound-absorbing splitter group composed of a plurality of sound-absorbing splitters capable of reducing high frequency component noise and a middle/low frequency sound-absorbing splitter group composed of a plurality of sound-absorbing splitters capable of reducing middle/low frequency component noise are disposed separately in the gas flow direction. As a result of a configuration such as this, high frequency component noise can be reduced by the high frequency sound-absorbing splitter group. Middle/low frequency component noise can be reduced by the middle/low sound-absorbing splitter group.

In an intake silencer of a gas turbine according to a second aspect of the present invention, the high frequency sound-absorbing splitter group is disposed on an upstream side in the gas flow direction, and the middle/low sound-absorbing splitter group is disposed on a downstream side of the high frequency sound-absorbing splitter group. In an intake silencer of a gas turbine according to a third aspect of the present invention, the middle/low sound-absorbing splitter group is disposed on an upstream side in the gas flow direction, and the high frequency sound-absorbing splitter group is disposed on a downstream side of the middle/low sound-absorbing splitter group. As a result of a configuration such as this, high frequency component noise and middle/low frequency component noise can be successfully reduced regardless of which sound-absorbing splitter group is disposed on the upstream side in the flow direction.

In an intake silencer of a gas turbine according to a fourth aspect of the present invention, length, width, and interval of each sound-absorbing splitter configuring the high frequency sound-absorbing splitter group are each formed shorter than those of each sound-absorbing splitter configuring the middle/low sound-absorbing splitter group. As a result of a configuration such as this, characteristics of each sound-absorbing splitter configuring the high frequency sound-absorbing splitter group and each sound-absorbing splitter configuring the middle/low sound-absorbing splitter group can be utilized, thereby successfully reducing high frequency component and middle/low frequency component noise.

In an intake silencer of a gas turbine according to a fifth aspect of the present invention, each sound-absorbing splitter group is configured by at least one sound-absorbing splitter block in which a plurality of sound-absorbing splitters of a same shape is fixed within a rectangular tube-shaped frame. As a result of a configuration such as this, components can be standardized. Cost can be reduced, and processing and design can be facilitated.

In an intake silencer of a gas turbine according to a sixth aspect of the present invention, a metal portion configuring each sound-absorbing splitter is formed by corrosion-resistant aluminum. As a result of a configuration such as this, weight reduction can be achieved. In an intake silencer of a gas turbine according to a seventh aspect of the present invention, a plurality of metal portions configuring each sound-absorbing splitter is fitted together and fixed. As a result of a configuration such as this, the sound-absorbing splitter can be assembled without dependence on the fastening power of rivets.

EFFECT OF THE INVENTION

In the intake silencer of a gas turbine of the present invention, a high frequency sound-absorbing splitter group composed of a plurality of sound-absorbing splitters capable of reducing high frequency component noise and a middle/low sound-absorbing splitter group composed of a plurality of sound-absorbing splitters capable of reducing middle/low frequency component noise are disposed separately in a gas flow direction. Therefore, high frequency component noise and middle/low frequency component noise can be successfully reduced. Moreover, high-frequency component noise and middle/low frequency component noise can be successfully reduced regardless of which sound-absorbing splitter group of either the high frequency sound-absorbing splitter group or middle/low sound-absorbing splitter group is disposed on the upstream side in the as flow direction.

In addition, each sound-absorbing splitter configuring the high frequency sound-absorbing splitter group is formed such that its length, width, and interval are each shorter than those of each sound-absorbing splitter configuring the middle/low sound-absorbing splitter group. Therefore, the characteristics of each sound-absorbing splitter configuring the high frequency sound-absorbing splitter group and each sound-absorbing splitter configuring the middle/low sound-absorbing splitter group can be utilized, thereby successfully reducing high frequency component and middle/low frequency component noise.

In addition, each sound-absorbing splitter group is configured by at least one sound-absorbing splitter block in which a plurality of sound-absorbing splitters of a same shape is fixed within a rectangular tube-shaped frame. Therefore, components can be standardized. Cost can be reduced, and processing and design can be facilitated.

Metal portions configuring each sound-absorbing splitter are formed by corrosion-resistant aluminum. Therefore, overall weight can be reduced.

In addition, a plurality of metal portions configuring each sound-absorbing splitter is fitted together and fixed. Therefore, the sound-absorbing splitter can be assembled without dependence on the fastening power of rivets. There is no risk of a rivet flying off and damaging a blade of the gas turbine and the like.

BEST MODE FOR CARRYING OUT THE INVENTION

Figure 1:
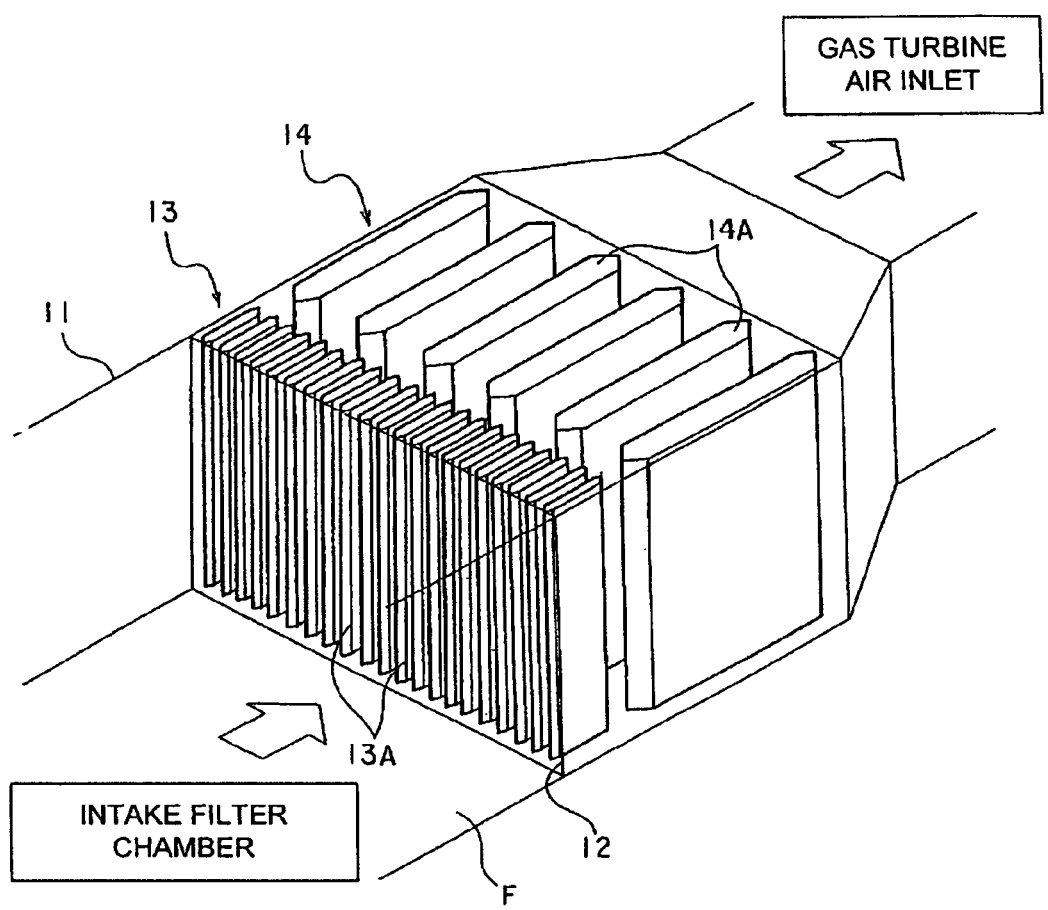
FIG. 1 is a perspective view of an intake silencer for a gas turbine according to an embodiment of the present invention.

FIG. 1 is a diagram of an intake silencer for a gas turbine according to an embodiment of the present invention. A high frequency sound-absorbing splitter group 13 is disposed on an upstream side in a gas flow direction, indicated by a thick outline arrow, on a downstream side of an intake filter chamber (not shown) in the gas flow direction, within a sealed flow path 12 blocked from its periphery by a duct 11 on an intake side of a gas turbine. The high frequency sound-absorbing splitter group 13 is composed of a plurality of sound-absorbing splitters 13A and 13A capable of reducing high frequency component noise. A middle/low sound-absorbing splitter group 14 is disposed within the sealed flow path 12 further on the downstream side in the gas flow direction than the high frequency sound-absorbing splitter group 13. The middle/low sound-absorbing splitter group 14 is composed of a plurality of sound-absorbing splitters 14A and 14A capable of reducing middle/low frequency component noise. Therefore, the high frequency sound-absorbing splitter group 13 and the middle/low sound-absorbing splitter group 14 are disposed separately in the gas flow direction.

Figure 2:
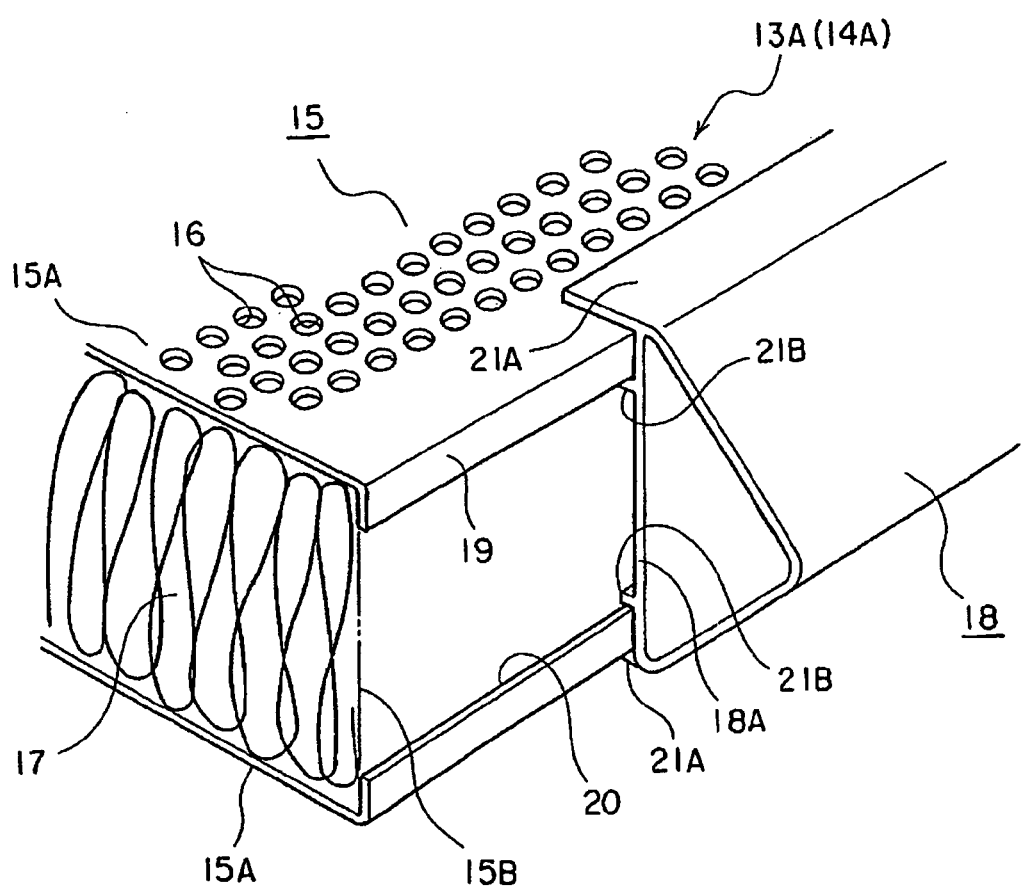
FIG. 2 is a partial perspective view of details of a sound-absorbing splitter in FIG. 1.

As shown in FIG. 2, each sound-absorbing splitter 13A and 14A has a corrosion-resistant aluminum outer peripheral wall 15 forming a rough rectangular panel. Numerous through holes 16 and 16 are formed in an aligned state on each of two mutually-opposing side plates 15A and 15A of the outer peripheral wall 15. The interior of the outer peripheral wall 15 is filled with a sound-absorbing material 17, such as a glass wool, a rock wool, or a polyester board. In FIG. 2, the sound-absorbing material 17 is shown in an exposed state. However, in actuality, the upper surface and the bottom surface of each sound-absorbing splitter 13A and 14A are covered by a corrosion-resistant aluminum end plate 15B having a U-shaped cross-section. The end plate 15B is fitted between the two side plates 15A and 15A such that the sound-absorbing material 17 is not exposed.

Moreover, corrosion-resistant aluminum tapered frame members 18 and 18 are connected to a front end section and a rear end section of the outer peripheral wall 15. Each frame member 18 and 18 forms a triangle from a planar view. The tapered frame members 18 and 18 straighten gas flow passing through the splitter.

In other words, each side plate 15A of the outer peripheral wall 15 is formed having an overall U-shaped cross-section as a result of a bent end plate 19 that is bent to each end surface side. Therefore, a long groove 20 is formed between the bent end plates 19 and 19 of the two side plates 15A and 15A, from which the sound-absorbing component 17 is exposed.

On the other hand, two pairs of projections 21A and 21B are disposed on a base section 18A of each tapered frame member 18 such as to project at right angle. The projections 21A and 21B are put in the bent end plate 19 of each side plate 15A of the outer peripheral wall 15. As a result of the pair of projections 21A and 21B being fitted onto both sides of the bent end plate 19 of the side plate 15A, the two side plates 15A and 15A are held by the two pairs of projections 21A and 21B of each tapered frame member 18. Each side plate 15A is fixed such as to cover the sound-absorbing member 17.

As described above, the plurality of metal portions of each sound-absorbing splitter 13A and 14A are fixed by being fitted together. The length of each sound-absorbing splitter 13A in the high frequency sound-absorbing splitter group 13 in the gas flow direction is about 40 centimeters. The width of each sound-absorbing splitter 13A is about 5 centimeters. Moreover, a gap between a pair of adjacent sound-absorbing splitters 13A and 13A is about 5 centimeters. The length of each sound-absorbing splitter 14A in the middle/low sound-absorbing splitter group 14 in the gas flow direction is about 175 centimeters. The width of each sound-absorbing splitter 14A is about 20 centimeters. Moreover, a gap between a pair of adjacent sound-absorbing splitters 14A and 14A is about 30 centimeters.

In addition, a gap between each sound-absorbing splitter 13A in the high frequency sound-absorbing splitter group 13 and each sound-absorbing splitter 14A in the middle/low sound-absorbing splitter group 14 is about 25 centimeters.

Similar noise reduction effects can be achieved by the positions of the high frequency sound-absorbing splitter group 13 and the middle/low sound-absorbing splitter group 14 in the gas flow direction being reversed, such that the middle/low sound-absorbing splitter group 14 is disposed further upstream than the high frequency sound-absorbing splitter group 13.

Figure 3:
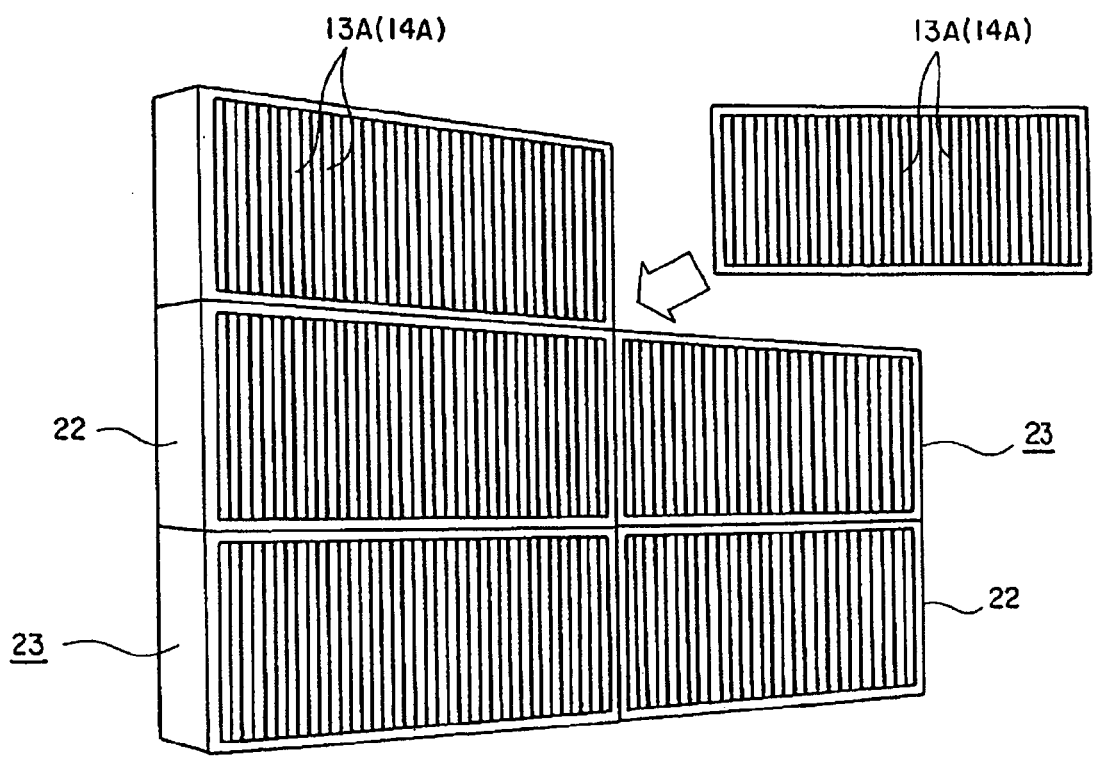
FIG. 3 is a perspective view of a variation example of the embodiment in FIG. 1 in which a sound-absorbing splitter block is used.

FIG. 3 shows each sound-absorbing splitter group 13 and 14 configured with each sound-absorbing splitter 13A and 14A.

In other words, a plurality of sound-absorbing splitters 13A or sound-absorbing splitters 14A having a same shape is disposed at even intervals and fixed within a rectangular frame 22, thereby forming a sound-absorbing splitter block 23. According to the embodiment in FIG. 3, the sound-absorbing splitter blocks 23 are assembled three down and two across. As a result of the sound-absorbing block 23 being formed in this way, components can be standardized. Cost can be reduced, and processing and design can be facilitated.

Next, effects of the above-described configuration according to the embodiment will be described.

Noise reduction effects of the intake silencer of a gas turbine according to the embodiment will be described with reference to a graph in FIG. 4.

Figure 4:
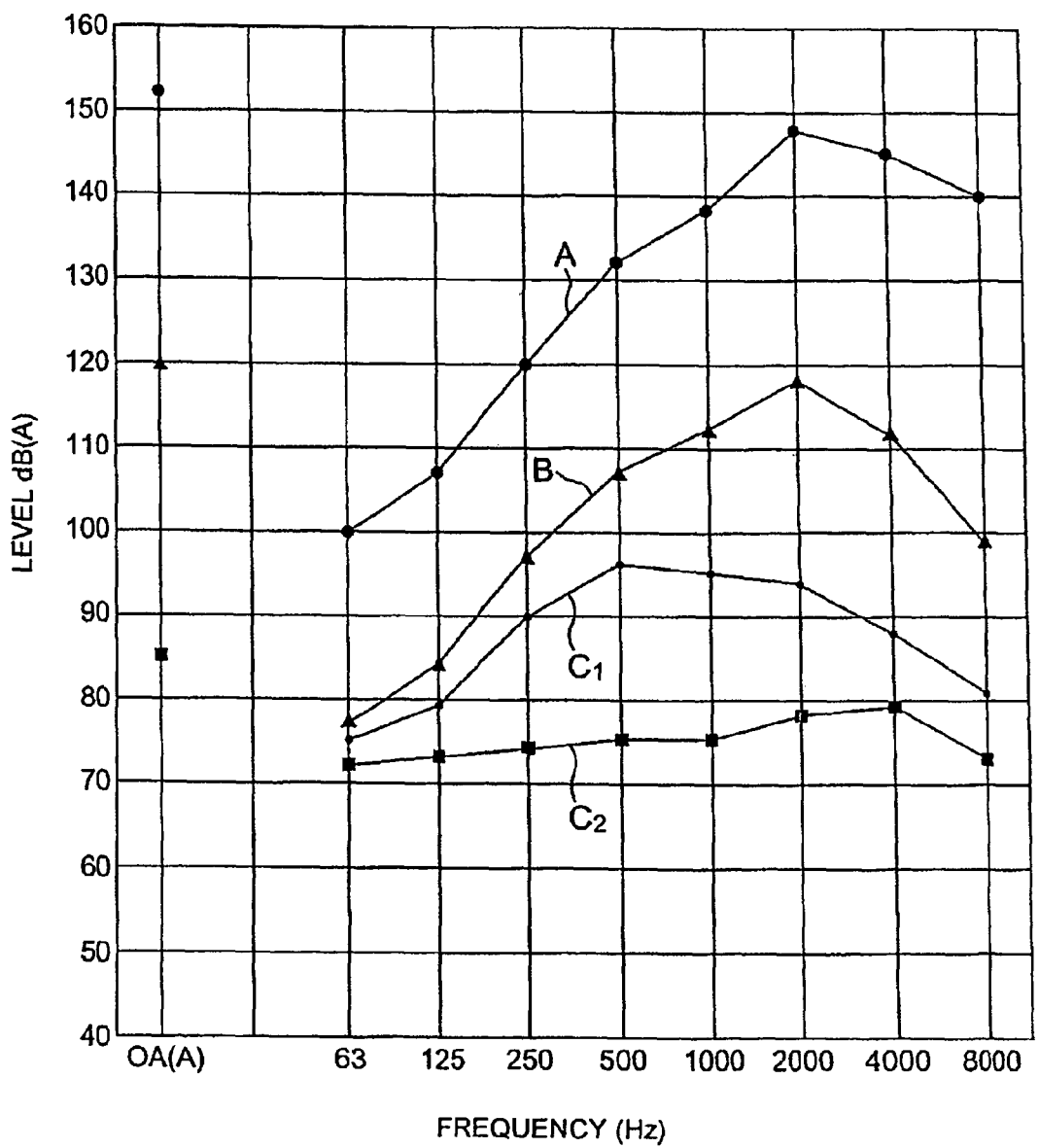
FIG. 4 is a graph of noise reduction effects of the intake silencer for a gas turbine according to the embodiment in FIG. 1.
Figure 5:
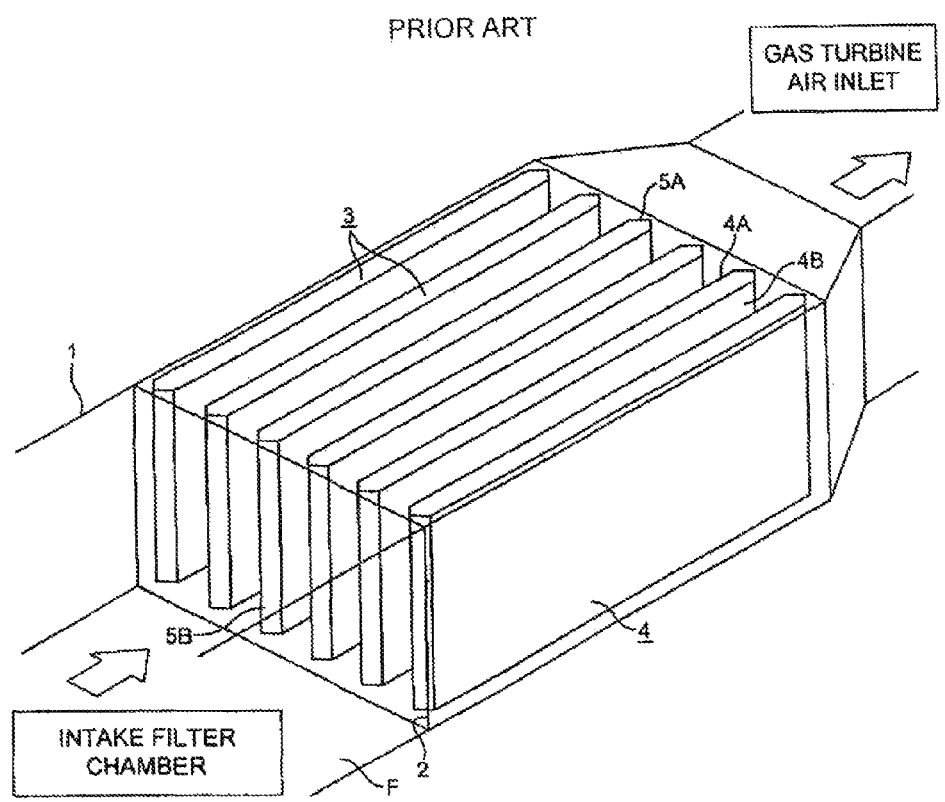
FIG. 5 is a perspective view of a conventional intake silencer for a gas turbine.
Figure 6:
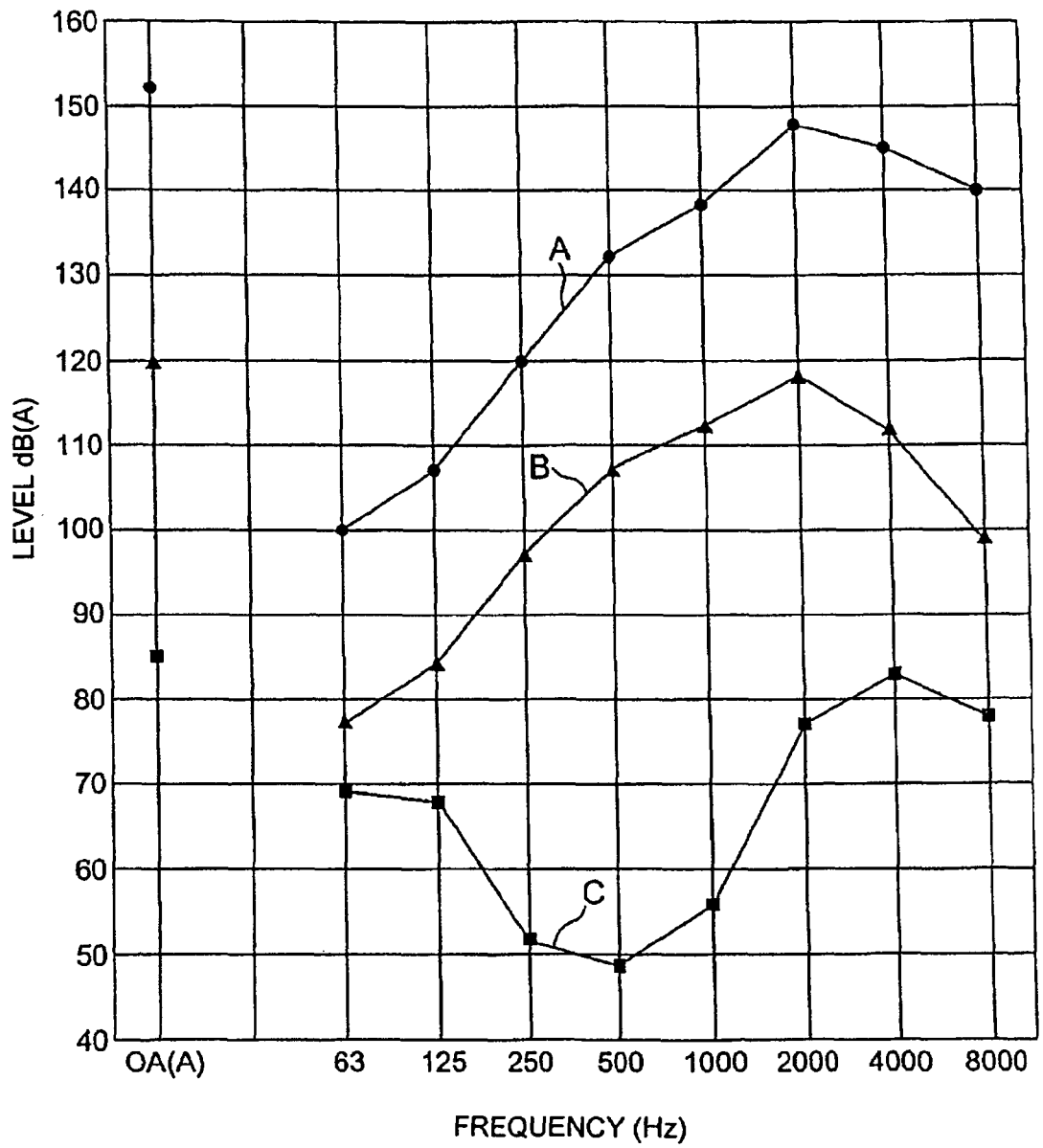
FIG. 6 is a graph of noise reduction effects of the intake silencer for a gas turbine in FIG. 5.

As indicated by line A in FIG. 4, the power level of the noise generated in the gas turbine is a maximum of under 150 dB(A) at the dominant frequency 2 kHz.

On the other hand, as indicated by line B in FIG. 4, the noise at the front of the intake filter before installation of the intake silencer shows a maximum of under 120 dB(A) at the dominant frequency 2 kHz.

As indicated by line $C_1$ in FIG. 4, the noise at the front of the intake filter in the intake filter chamber F after the installation of the intake silencer is first reduced such that the maximum noise is 95 dB(A) at the frequency 500 Hz, as a result of the noise passing through the high frequency sound-absorbing splitter group 13 positioned on the upstream side in the gas flow direction. As indicated by line $C_2$ in FIG. 4, the noise is then reduced such that the maximum noise is under 80 dB(A) at the frequency 4 kHz, as a result of the noise passing through the middle/low sound-absorbing splitter group 14 positioned on the downstream side in the gas flow direction. At this time, the noise is reduced such that the minimum noise is over 70 dB(A) at the frequency 63 Hz.

In other words, in the conventional intake silencer for a gas turbine, noise level after reduction is uneven over the overall frequency range, with a maximum of over 80 dB(A) and a minimum of under 50 dB(A). However, in the intake silencer for a gas turbine according to the embodiment, noise level after reduction is almost even over the overall frequency range without needless reduction, with a maximum of under 80 dB(A) and a minimum of over 70 dB(A). Therefore, noise reduction can be successfully performed by the two sound-absorbing splitter groups 13 and 14 having an overall shorter length compared to the conventional intake silencer. Therefore, cost reduction can be achieved within a limited space.

According to the embodiment, each sound-absorbing splitter 13A and 14A is assembled by being fixed simply by a plurality of metal components being fitted together, rather than being fixed by rivets as in the convention intake silencer. Therefore, there is no risk of damage to a blade of the gas turbine and the like caused by a rivet becoming detached and flying off.

Moreover, weight reduction can be achieved because each sound-absorbing splitter 13A and 14A is formed by corrosion-resistant aluminum. Further weight reduction can be achieved by each sound-absorbing splitter 13A and 14A being formed by hardened plastic instead of corrosion-resistant aluminum.

Furthermore, components can be standardized as a result of the sound-absorbing splitter block 23 being formed in which the sound-absorbing splitters are formed into a block. Cost can be reduced, and processing and design can be facilitated The present invention is not limited to the above-described embodiments. Various modifications can be made as required. In other words, the dimensions of the sound-absorbing splitters, noise levels, noise frequencies, and the like are merely examples. The present invention is not limited by the above-described numbers according to the embodiments.

The invention claimed is:

1. An intake silencer for a gas turbine disposed in a sealed flow path of an intake of a gas turbine and configured by a sound-absorbing splitter group composed of a plurality of panel-shaped sound-absorbing splitters including a sound-absorbing material therein disposed in parallel along a gas flow direction, wherein
   a high frequency sound-absorbing splitter group composed of a plurality of sound-absorbing splitters that reduces high-frequency component noise of a frequency level centered on 2 kHz, each of said high frequency sound-absorbing splitters being 5 centimeters in width and a gap between a pair of adjacent high frequency sound-absorbing splitters being 5 centimeters, and
   a middle to low frequency sound-absorbing splitter group composed of a plurality of sound-absorbing splitters that reduces middle to low frequency component noise of equal to or below 1 kHz, each of said middle to low frequency sound-absorbing splitters being 20 centimeters in width and a gap between a pair of adjacent middle to low frequency sound-absorbing splitters being 30 centimeters, and
   said high frequency sound-absorbing splitter group and said middle to low frequency sound-absorbing splitter group are disposed separately in the gas flow direction.

2. The intake silencer for a gas turbine according to claim 1, wherein the high frequency sound-absorbing splitter group is disposed on an upstream side in the gas flow direction, and the middle to low frequency sound-absorbing splitter group is disposed on a downstream side of the high frequency sound-absorbing splitter group.

3. The intake silencer for a gas turbine according to claim 1, wherein the middle to low frequency sound-absorbing splitter group is disposed on an upstream side in the gas flow direction, and the high frequency sound-absorbing splitter group is disposed on a downstream side of the middle/low sound-absorbing splitter group.

* * * * *